US008196939B2

(12) United States Patent
Bustle et al.

(10) Patent No.: US 8,196,939 B2
(45) Date of Patent: Jun. 12, 2012

(54) MEDICAL CART AND DRAWER ASSEMBLY AND LOCK

(75) Inventors: Benjamin Shane Bustle, Charlotte, NC (US); Jacob Connelly, Concord, NC (US); Chad M. Holzshu, Huntersville, NC (US); Robert Grant McRorie, Huntersville, NC (US)

(73) Assignee: Rubbermaid Incorporated, Huntersville, NC (US)

( * ) Notice: Subject to any disclaimer, the term of this patent is extended or adjusted under 35 U.S.C. 154(b) by 582 days.

(21) Appl. No.: 12/389,721

(22) Filed: Feb. 20, 2009

(65) Prior Publication Data

US 2009/0212670 A1 Aug. 27, 2009

Related U.S. Application Data

(60) Provisional application No. 61/064,202, filed on Feb. 21, 2008.

(51) Int. Cl.
*B62B 3/00* (2006.01)

(52) U.S. Cl. ...................... 280/47.35; 312/221; 312/222

(58) Field of Classification Search ............... 280/47.35, 280/47.34, 79.3, 79.2, 79.11; 312/334.44, 312/334.45, 334.46, 334.47, 333, 215, 216, 312/217, 219, 220, 221, 222, 218
See application file for complete search history.

(56) References Cited

U.S. PATENT DOCUMENTS 824,653 A * 6/1906 Hodell .......................... 312/221
1,124,791 A * 1/1915 Ohnstrand .................... 312/221
1,139,940 A * 5/1915 Westmoreland .............. 312/221
3,150,902 A * 9/1964 Naab et al. .................... 312/217
3,194,623 A * 7/1965 Burgess ........................ 312/333
3,980,363 A * 9/1976 Dean et al. .................... 312/294
3,990,630 A * 11/1976 Cutter ............................ 232/44
4,121,878 A * 10/1978 Lokken .................... 312/334.45
D273,906 S 5/1984 Norlin
4,684,178 A * 8/1987 Craig ............................ 312/221
4,993,784 A * 2/1991 Dana et al. .................... 312/221
5,225,825 A * 7/1993 Warren ........................ 340/5.22
5,243,736 A * 9/1993 Cannaday et al. ................ 16/82
5,388,902 A * 2/1995 Huebschen et al. .......... 312/332
5,392,951 A 2/1995 Gardner et al.
5,445,294 A * 8/1995 Gardner et al. ................... 221/1
5,445,451 A * 8/1995 Harmony ...................... 312/333
5,795,044 A * 8/1998 Trewhella et al. ............ 312/333
6,011,999 A * 1/2000 Holmes ......................... 700/231
6,347,848 B1 * 2/2002 Cho ............................. 312/219
6,409,290 B1 * 6/2002 Lin .............................. 312/219
6,511,138 B1 * 1/2003 Gardner et al. ............... 312/217
6,601,884 B2 * 8/2003 Bastian ......................... 292/222
6,663,202 B2 * 12/2003 Spann ...................... 312/249.12
(Continued)

*Primary Examiner* — John R Olszewski
*Assistant Examiner* — Brodie Follman
(74) *Attorney, Agent, or Firm* — Dennis J. Williamson; Moore & Van Allen, PLLC

(57) ABSTRACT

The drawer assembly comprises a cabinet defining an internal space. A shelf is supported in the cabinet. The shelf supports a latch that is movable between a first position and a second position. A drawer is supported on the shelf where the drawer has a latch receiving structure formed thereon. The latch receiving structure includes a first surface engageable with the latch when the latch is in the first position and a second surface also engageable with the latch when the latch is in the first position such that the drawer can be locked relative to the cabinet in one of two positions. In one embodiment the drawer is supported on a mobile medical cart. The cart may also include a computer such as a PC, wireless communications systems to communicate with a wider network system, a system controller and/or other systems.

25 Claims, 16 Drawing Sheets

U.S. PATENT DOCUMENTS

| | | | | |
|---|---|---|---|---|
| 6,746,091 | B2 * | 6/2004 | Friar et al. | 312/218 |
| 6,843,488 | B1 * | 1/2005 | Tseng | 280/47.35 |
| 6,896,342 | B1 * | 5/2005 | Cheng | 312/221 |
| 7,052,097 | B2 * | 5/2006 | Meek et al. | 312/222 |
| 7,152,441 | B2 * | 12/2006 | Friar et al. | 70/78 |
| 7,232,195 | B2 * | 6/2007 | Yang | 312/333 |
| 7,264,319 | B2 * | 9/2007 | Cheng | 312/220 |
| 7,467,833 | B2 * | 12/2008 | Weng | 312/221 |
| 7,594,668 | B2 * | 9/2009 | Arceta et al. | 280/47.35 |
| 7,747,347 | B2 * | 6/2010 | Park, IV | 700/243 |
| 2002/0165641 | A1 * | 11/2002 | Manalang et al. | 700/237 |
| 2003/0102784 | A1 * | 6/2003 | Friar et al. | 312/218 |
| 2004/0262867 | A1 * | 12/2004 | Arceta et al. | 280/47.35 |
| 2005/0006993 | A1 * | 1/2005 | Salonen | 312/222 |
| 2005/0199022 | A1 * | 9/2005 | Friar et al. | 70/78 |
| 2007/0046158 | A1 * | 3/2007 | Hoffman | 312/333 |
| 2007/0187913 | A1 * | 8/2007 | Cheung | 280/47.35 |
| 2007/0228680 | A1 * | 10/2007 | Reppert et al. | 280/47.35 |
| 2008/0202976 | A1 * | 8/2008 | Burgess et al. | 206/558 |
| 2008/0278043 | A1 * | 11/2008 | Holcomb | 312/219 |
| 2009/0015116 | A1 * | 1/2009 | Arceta et al. | 312/209 |
| 2009/0055018 | A1 * | 2/2009 | Meek et al. | 700/237 |
| 2009/0212518 | A1 * | 8/2009 | Bustle et al. | 280/47.35 |
| 2009/0212670 | A1 * | 8/2009 | Bustle et al. | 312/209 |
| 2011/0233350 | A1 * | 9/2011 | Burgess et al. | 248/123.11 |

* cited by examiner

MEDICAL CART AND DRAWER ASSEMBLY AND LOCK

This application claims benefit of priority under 35 U.S.C. §119(e) to the filing date of to U.S. Provisional Application No. 61/064,202 as filed on Feb. 21, 2008, which is incorporated herein by reference in its entirety.

FIELD OF THE INVENTION

The invention relates to a drawer lock and more specifically to a drawer lock particularly suited for use in secure applications such as medical carts.

BACKGROUND

Locking mechanisms for drawers in a variety of applications are known. One use of such locks is in medical applications to secure and protect medications, medical equipment and the like. One such medical application is in mobile medical carts. Mobile medical carts are typically used in institutional applications for medication delivery, information processing or the like where the carts may be moved to the point of service delivery such as a patient room in a hospital. In such applications, because the carts are used in public areas, drawer security is an important issue.

An improved drawer assembly, lock and medical cart is desired.

SUMMARY OF THE INVENTION

The drawer assembly comprises a cabinet defining an internal space. At least one shelf is supported in the cabinet. The shelf supports a latch that is movable between a first position and a second position. At least one drawer is supported on each shelf where the drawer has a catch formed thereon. The catch includes a first surface engageable with the latch when the latch is in the first position and a second surface also engageable with the latch when the latch is in the first position such that the drawer can be locked relative to the cabinet in one of two positions. In one embodiment the drawer is supported on a medical cart. The cart may comprise a base supported on wheels where the base may provide an internal storage compartment for holding a power module such as a rechargeable battery. A vertically extending tower may support the drawer assembly and other cart components such as a monitor, user input device such as a keyboard and mouse, a work platform and storage bins. The cart may also include a computer such as a PC, a wireless communications system to communicate with a wider network system and a system controller.

DETAILED DESCRIPTION OF EMBODIMENTS OF THE INVENTION

Figure 1:
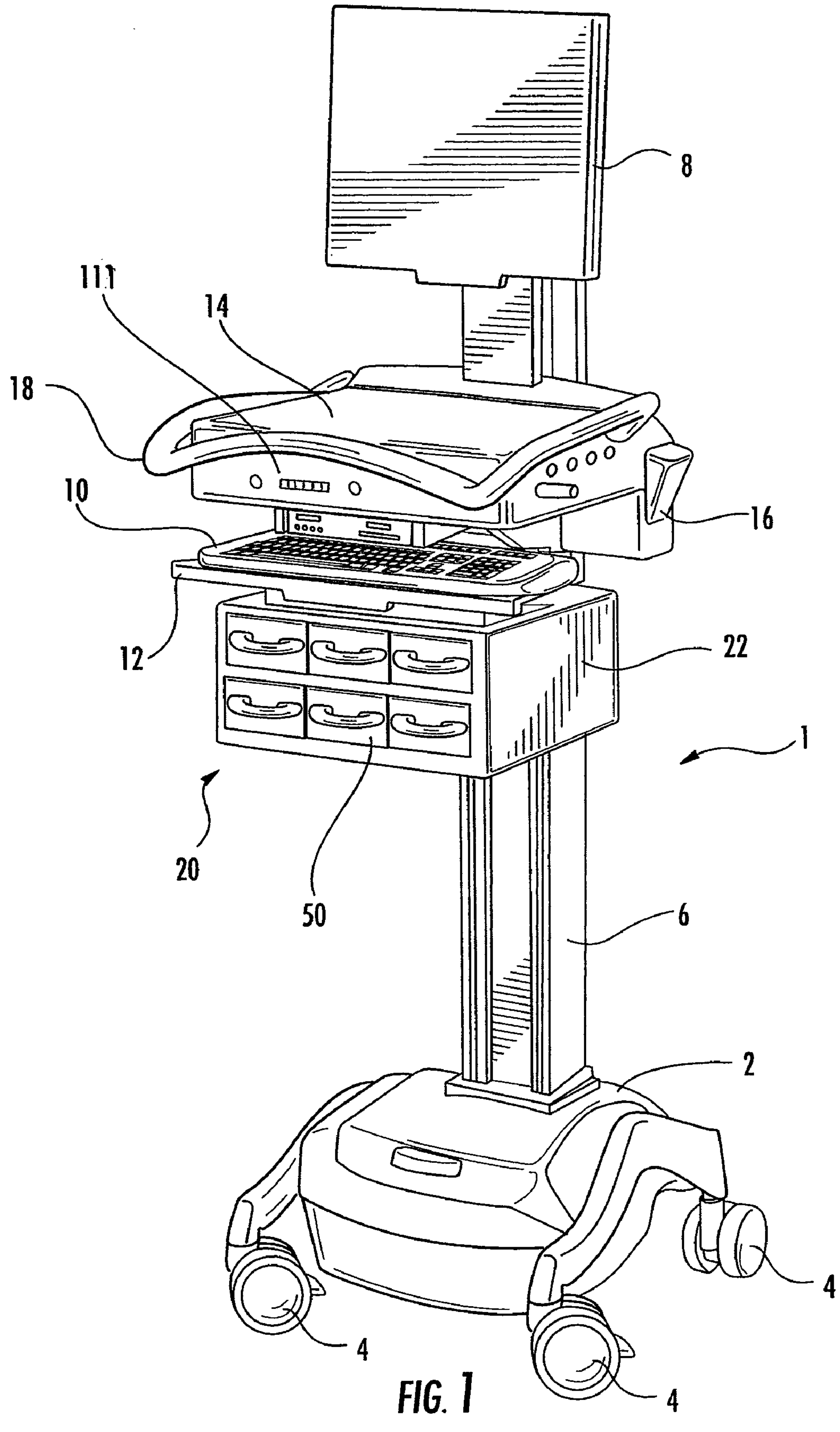
FIG. 1 is a perspective view showing an exemplary medical cart on which the drawer lock of the invention may be used.

Referring to FIG. 1 an exemplary medical cart in which the drawer assembly of the invention may be used is shown generally at 1. While a particular embodiment of a medical cart is shown it is to be understood that the drawer of the assembly may be used with other carts and may be used in any application where a secure drawer lock is useful. The cart comprises a base 2 supported on wheels 4 such that the cart can be rolled on a floor. The cart 1 may be pushed or pulled by medical personnel to move the cart to various points of service such as between patient rooms in an institutional setting. The base 2 may provide an internal storage compartment for holding a power module such as a rechargeable battery. Supported on base 2 is a vertically extending tower 6 that supports the other cart components such as a monitor 8, a user input device such as a keyboard and mouse 10 supported on a movable support 12, a work platform 14 and storage bins 16. These components may be movably mounted on the tower 6 such that the relative heights of the various components are adjustable. The work platform 14 may also include an internal storage compartment for supporting a computer such as a PC, wireless communications systems to communicate with a wider network system, a system controller and/or other systems. A handle 18 may be provided to facilitate the pushing and pulling of the cart 1.

An embodiment of the drawer assembly of the invention is shown at 20. The drawer assembly may be mounted to the tower 6 or to one of the other components such as the work platform 14 to allow the drawer assembly to be height adjustable. The drawer assembly comprises a cabinet 22 for retaining drawers 50.

Figure 2:
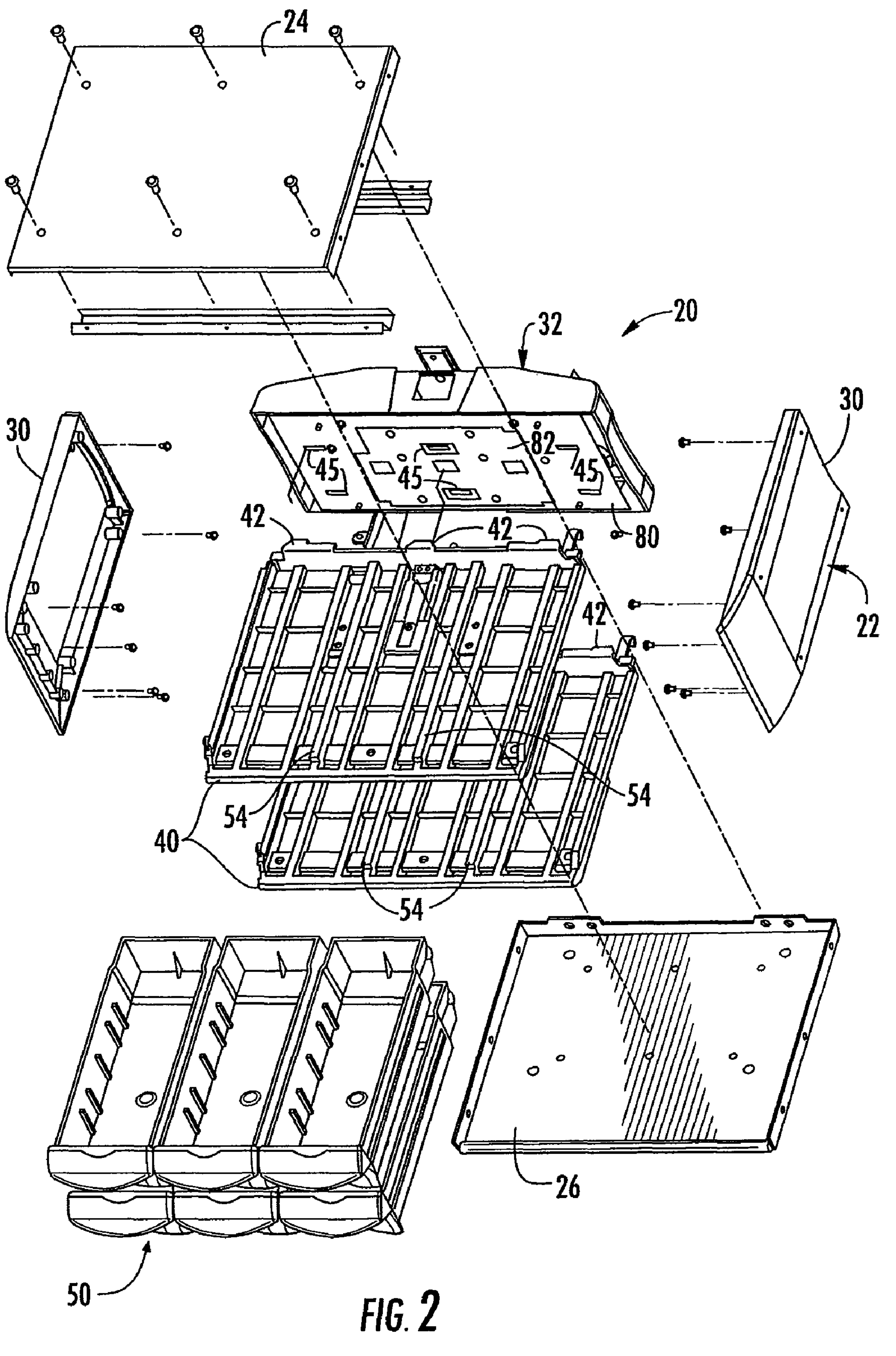
FIG. 2 is an exploded perspective front view of the drawer assembly and lock of the invention.
Figure 4:
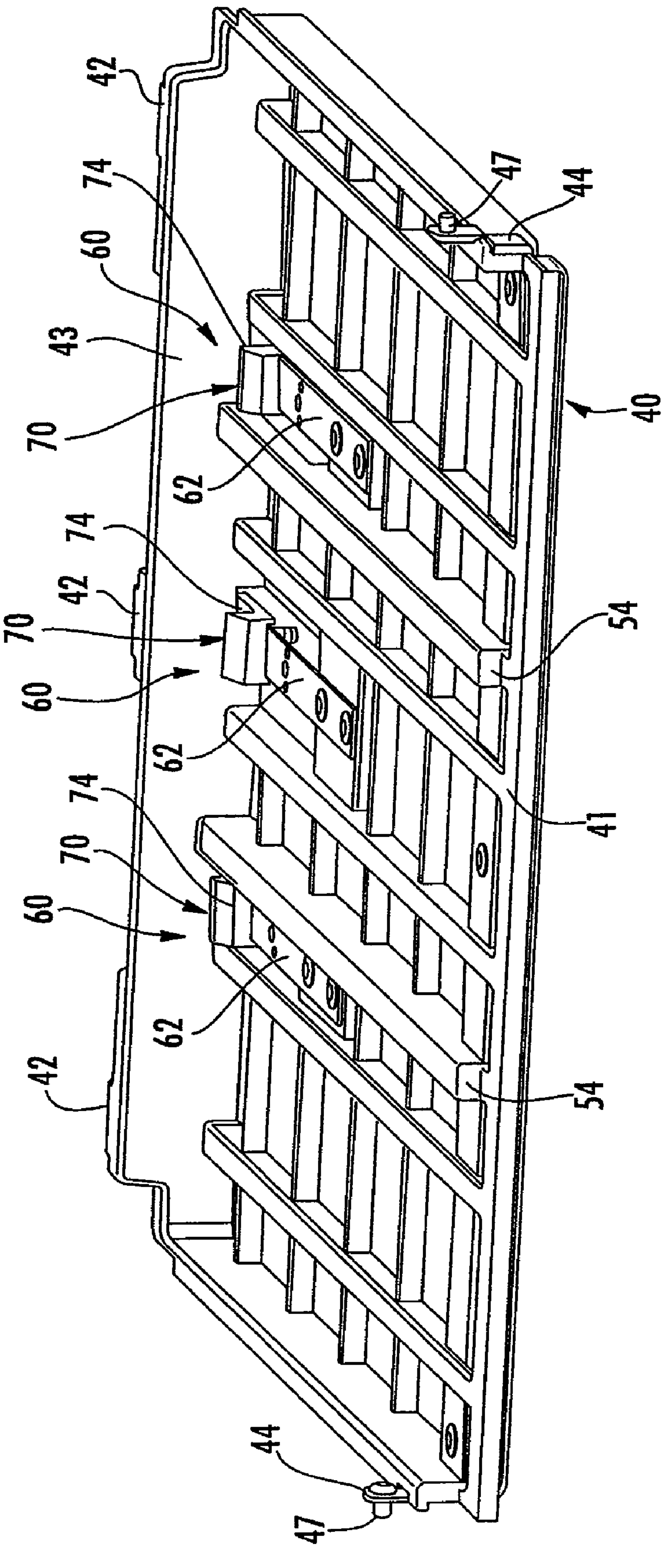
FIGS. 4 and 5 are detailed perspective front views of the shelf assembly and latch of the invention.
Figure 5:
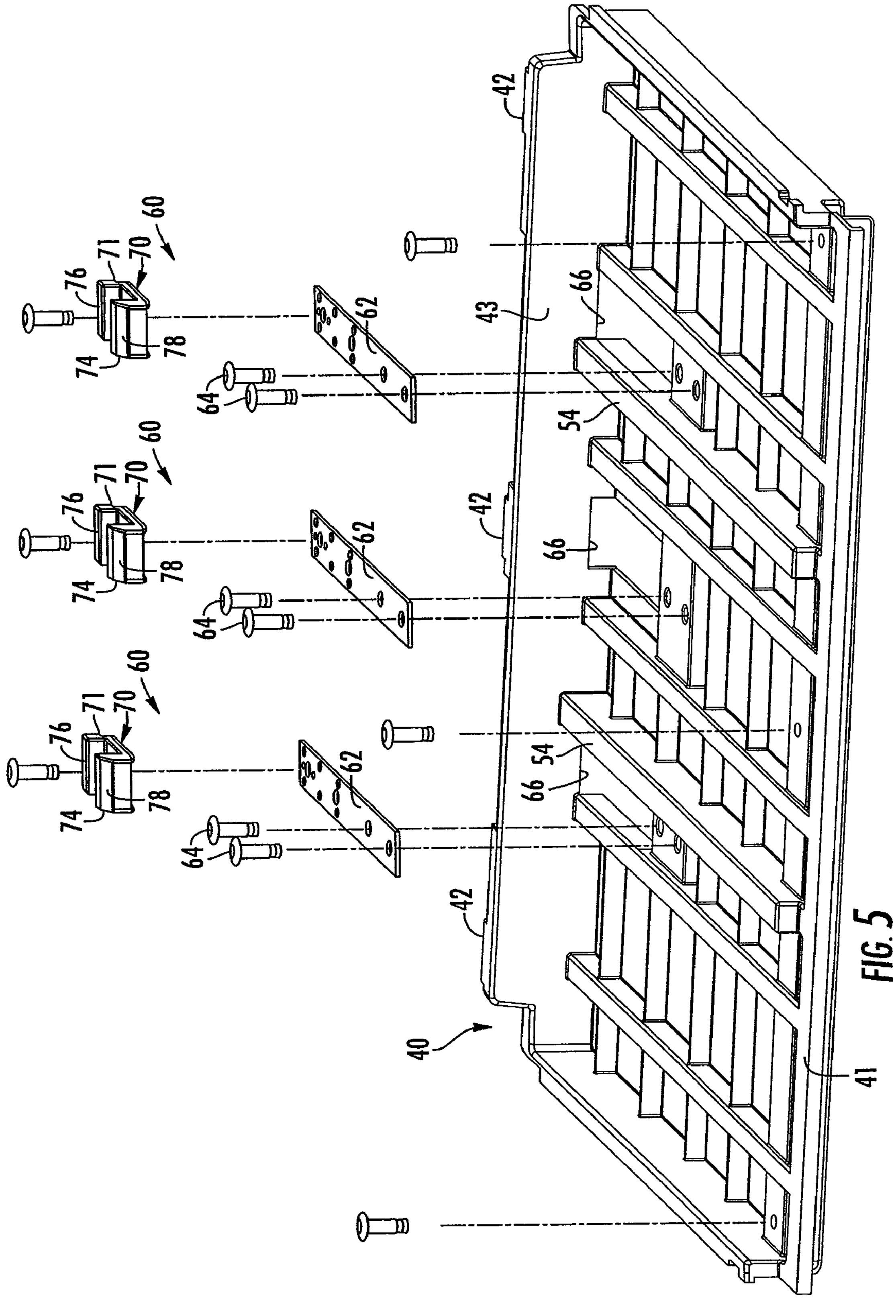

Referring to FIGS. 2, 4 and 5 the cabinet 22 comprises a top wall 24, bottom wall 26, and side walls 30 secured to one another to create an interior space for receiving the drawers. A back wall 32 is secured to the top, bottom and side walls to complete the compartment. The back wall 32 supports a portion of the locking actuator as will hereinafter be described.

At least one shelf 40 is removably supported in the cabinet 22 to support the drawers 50. In the embodiment of FIGS. 1 and 2 two such shelves 40 are provided to support two rows of drawers. Each shelf 40 includes a bottom wall 41 and a back wall 43 that extends upwardly from the rear edge of the bottom wall 41. Each shelf 40 includes projections 42 formed along the back edge thereof that releasably engage slots 45 formed in the back wall 32. The bottom wall 41 of shelf 40 includes raised rails 54 for guiding the drawers 50. Fasteners 47 engage through holes 44 on shelves 40 and side walls 30 to fix the front edge of the shelf 40 to the side walls 30. The fasteners 47 can be removed and projections 42 pulled from slots 45 to add or remove shelves 40 to and from cabinet 22 to provide for different drawer configurations as will hereinafter be described. At least one drawer 50 is supported on each shelf 40 such that the drawers can be slid into and out of cabinet 22. In the embodiment of FIGS. 1 and 2 three drawers 50 are supported on each of cabinet shelves 40.

Figure 8:
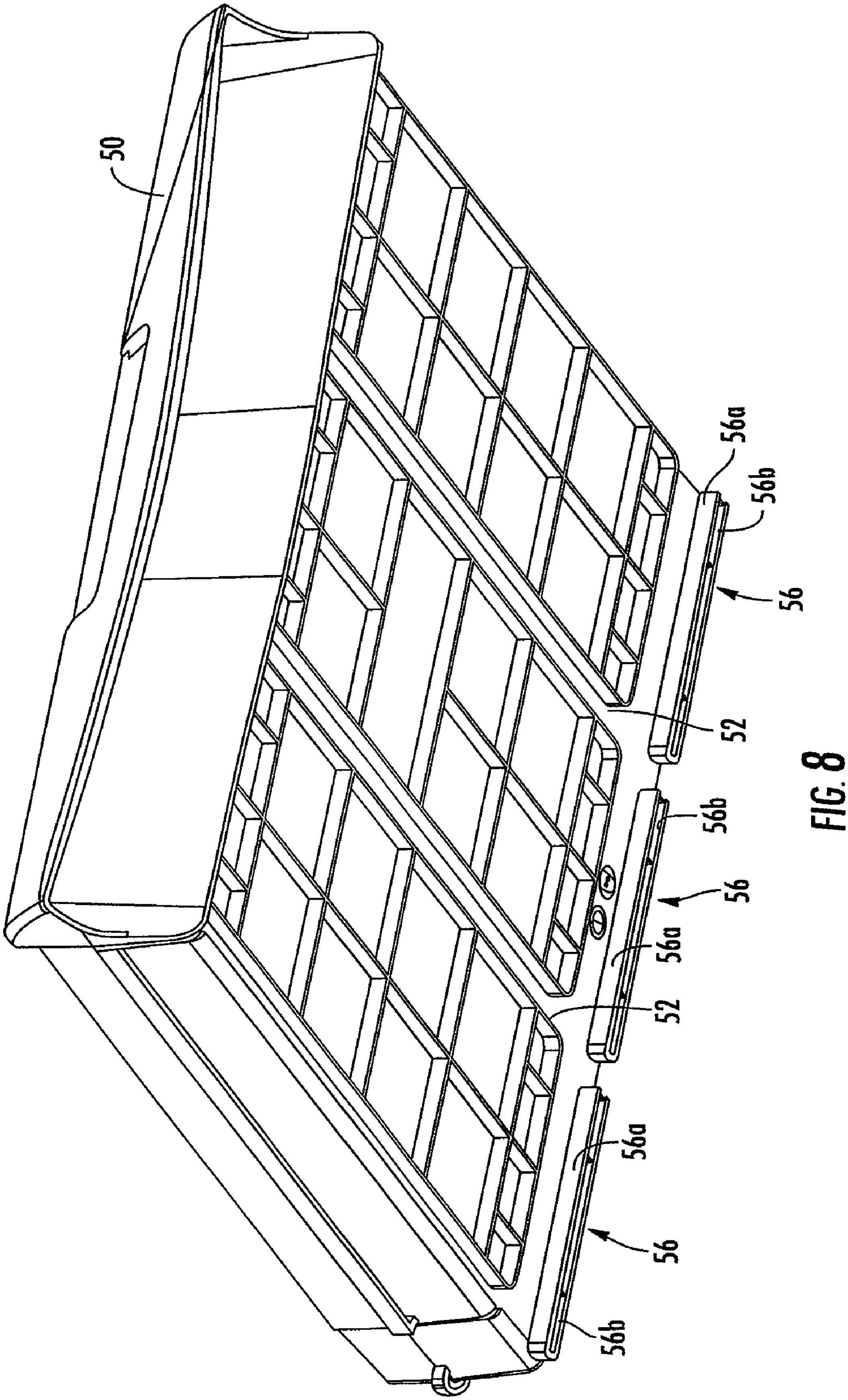
FIGS. 8 and 9 are perspective bottom views of embodiments of the drawer of the invention.
Figure 9:
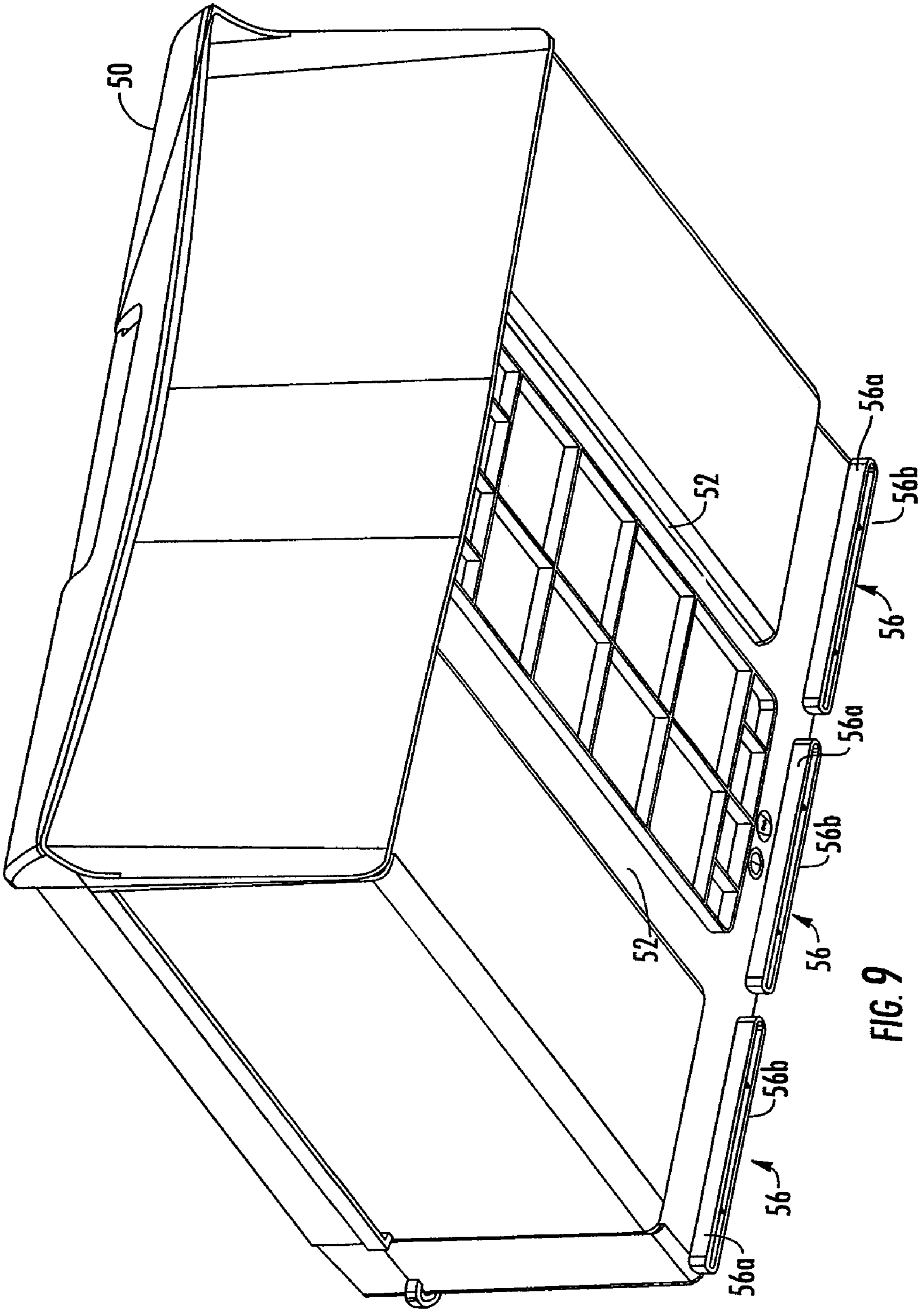

Referring to FIGS. 8 and 9 the bottom of the drawer 50 is formed with channels 52 that extend from near the front edge of the drawer toward the back edge of the drawer. The channels 52 ride on the rails 54 formed on the top of the shelf 40 to guide the movement of the drawers into and out of cabinet 22. Extending along the back edge of each drawer is a series of catches 56 that are engaged by the latches of the drawer locks to secure the drawers in the closed position as will hereinafter be described.

Referring to FIGS. 4 and 5 each shelf 40 is provided with at least one latch 60. In the illustrated embodiment three latches 60 are provided on each shelf 40. By providing three latches 60 per shelf 40 each shelf 40 may support up to three independently locking drawers 50. A greater or fewer number of latches 60 may be provided to lock a greater or fewer number of drawers 50 per shelf. Further, a latch 60 may be omitted if it is not desired that each of the three drawers be lockable.

Figure 13A:
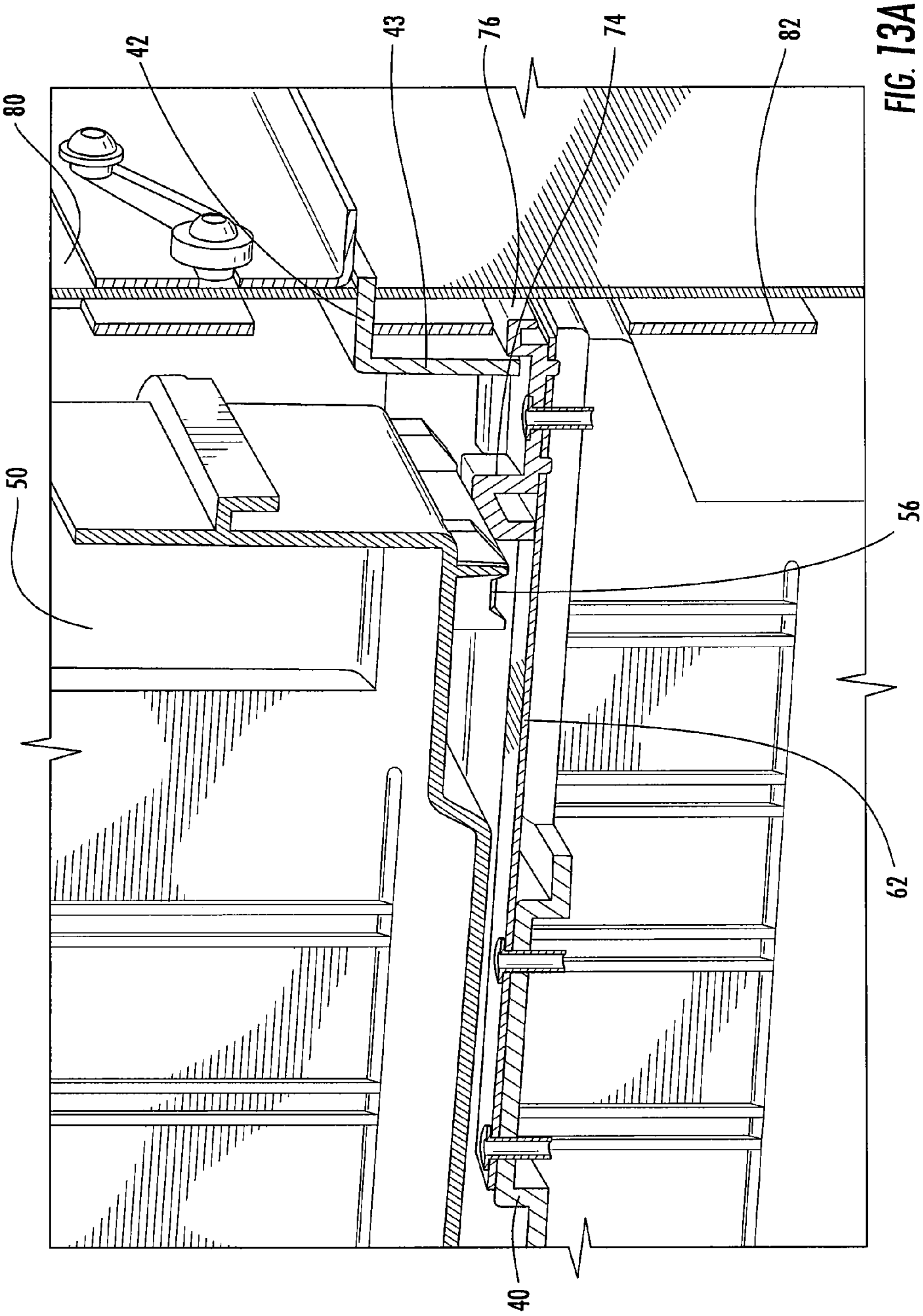
FIGS. 13*a* through 13*c* are partial section views showing the engagement of the latch with the catch.
Figure 13B:
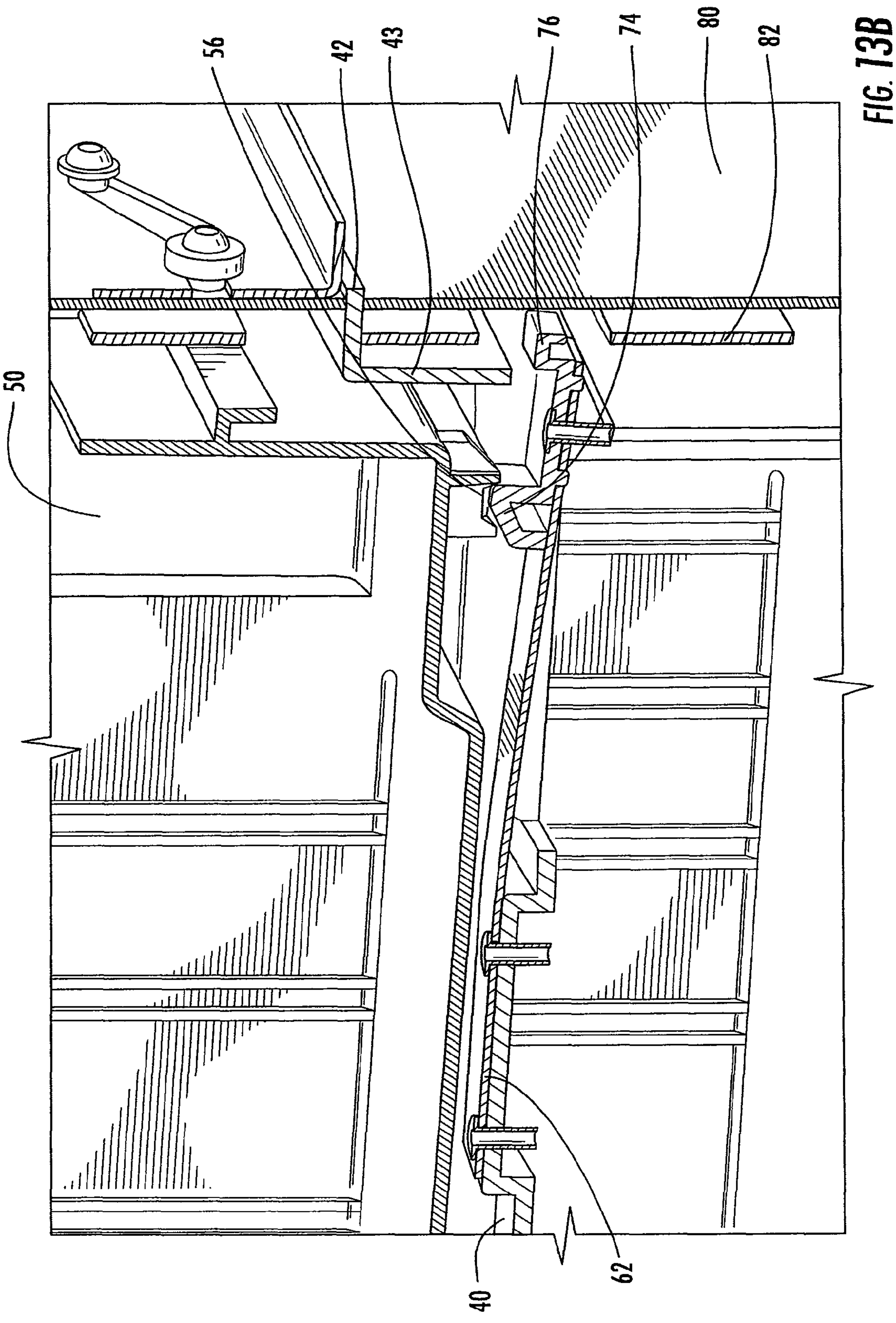
Figure 13C:
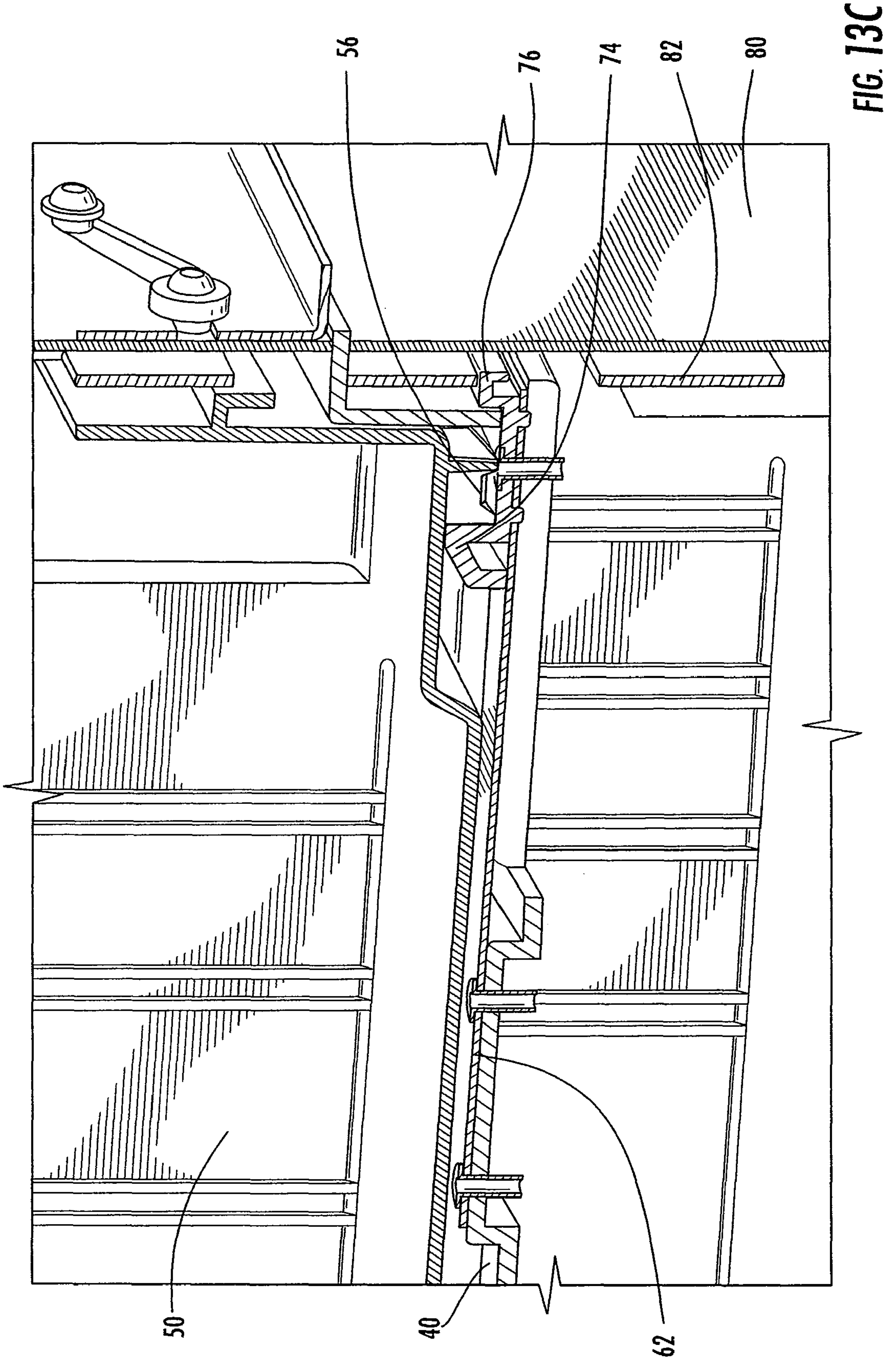

Each latch 60 comprises an elongated resilient support member 62 having one end secured to the shelf 40 such as by fasteners 64 and the opposite end extending into and through an aperture 66 formed in the bottom wall 41 and back wall 43 of shelf 40. Support member 62 may be made of steel, plastic or other resilient material that deforms and elastically returns to its original position. Alternatively, the support member 62 may be a rigid member biased by a separate spring. Support member 62 is dimensioned such that is extends through aperture 66 and adjacent to or slightly beyond back wall 43. A locking member 70 is secured to the free end of the member 62 such as by fasteners. The locking member 70 includes a front upwardly extending finger 74 and a rear upwardly extending finger 76 that are spaced from one another such that the space between the fingers 74 and 76 is large enough to receive rear wall 43. The locking member 70 is located on flexible member 62 such that the rear wall 43 is positioned between the front finger 74 and rear finger 76 when the flexible member 62 is in the non-deformed state as shown in FIGS. 4, 13*a* and 13*c*. The front face 78 of front finger 74 is formed at an angle relative to the direction of movement of the drawers and acts as a camming surface. When a drawer is pushed into the cabinet 22 the rear lower edge of the drawer and catches 56 contact face 78 to deform the flexible support member 62 and force the locking member 70 away from the bottom of the drawer 50 as shown in FIGS. 13*a* and 13*b*. As the drawer 50 is pushed in farther, the catch 56 passes over the front finger 74. Once the catch 56 clears the front finger 74, the support member 62 biases the locking member 70 upward and into engagement with the catch 56 to lock the drawer in the closed position.

Figure 16:
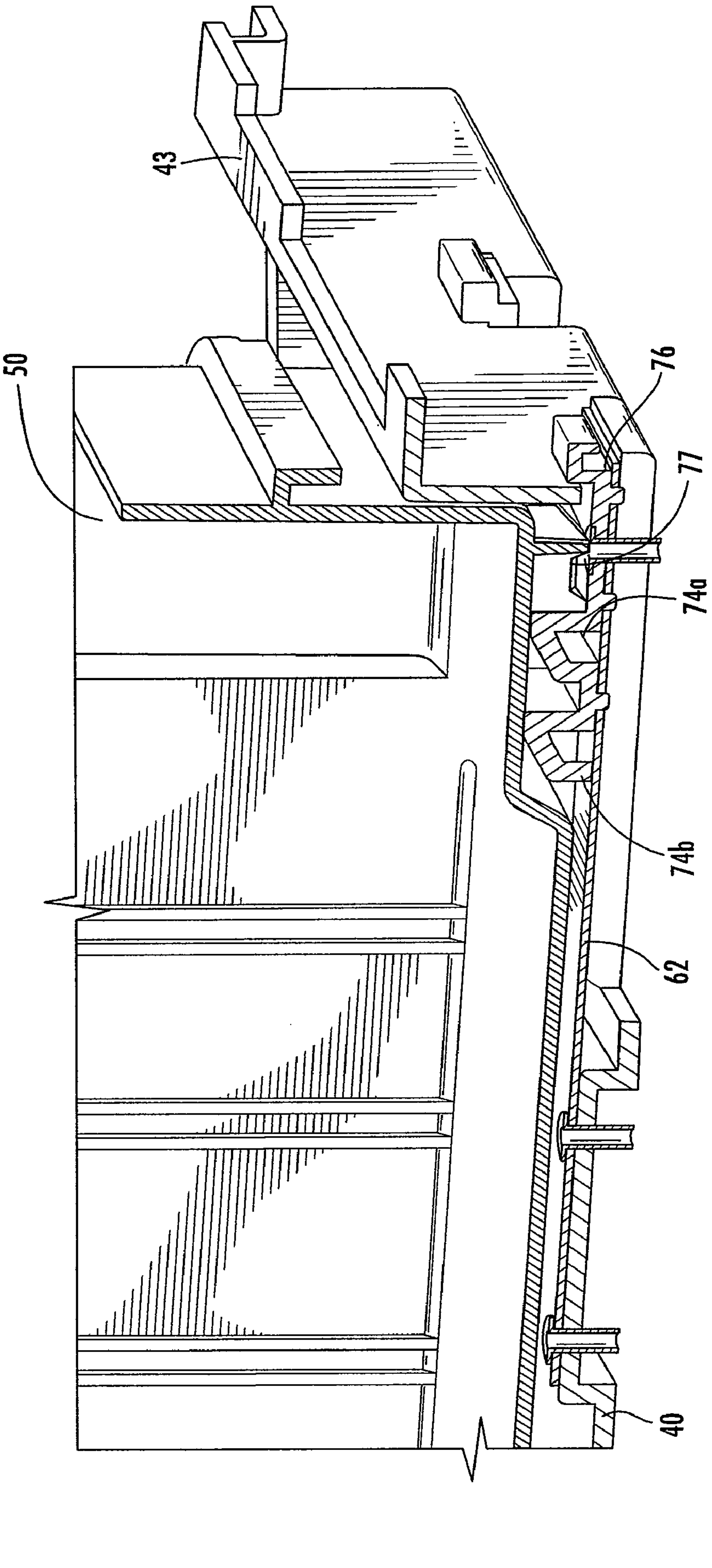
FIG. 16 is a partial section view showing an alternate embodiment of the engagement of the latch with the catch.

The catch 56 and locking member 70 are configured such that the drawer may be locked in one of two closed positions. Referring to FIGS. 8, 9 and 13*a*-13*c*, each catch 56 is formed as a projection with a downwardly extending front wall 56*a* and a downwardly extending back wall 56*b* that is spaced slightly behind the front wall 56*a*. The catch 56 is positioned and dimensioned such that the front finger 74 of locking member 70 can extend in front of either front wall 56*a* or in front of back wall 56*b*. In either position the drawer lock is engaged and the drawer is prevented from being pulled open until the lock is opened. When the drawer is in the fully closed position, i.e. pushed all of the way into cabinet 22, the front finger 74 engages the front of front wall 56*a* as shown in FIG. 13*c*. If the drawer is pushed closed but is left in a second position that is slightly ajar the front finger 74 engages the front of back wall 56*b* as shown in FIG. 13*b*. As a result the lock of the invention provides an extra degree of security by locking the drawer even if the drawer is not completely closed. The position of the second wall 56*b* is selected such that the drawer 50 is locked in a second position where the contents of the drawer cannot be removed when the drawer is ajar. While the catch 56 shown as a projection, the catch could have other structures such as recesses formed in the bottom of the drawers. Further, while a single front finger 74 engages one of two surfaces 56*a*, 56*b* on the catch 56, the components may be reversed where two front fingers 74*a* and 74*b* are spaced from one another a slight distance and engage the same surface of the catch 77 as shown in FIG. 16.

When locking member 70 is in the locked position with front finger 74 fully engaged with catch 56, the rear finger 76 is disposed behind wall 43. As a result, if a drawer 50 is pulled open with extreme force, the engagement of the rear finger 76 with the back wall 43 of shelf 40 resists the opening of the drawer such that the locking effect is not provided only by the strength of the support member 62.

Figure 3:
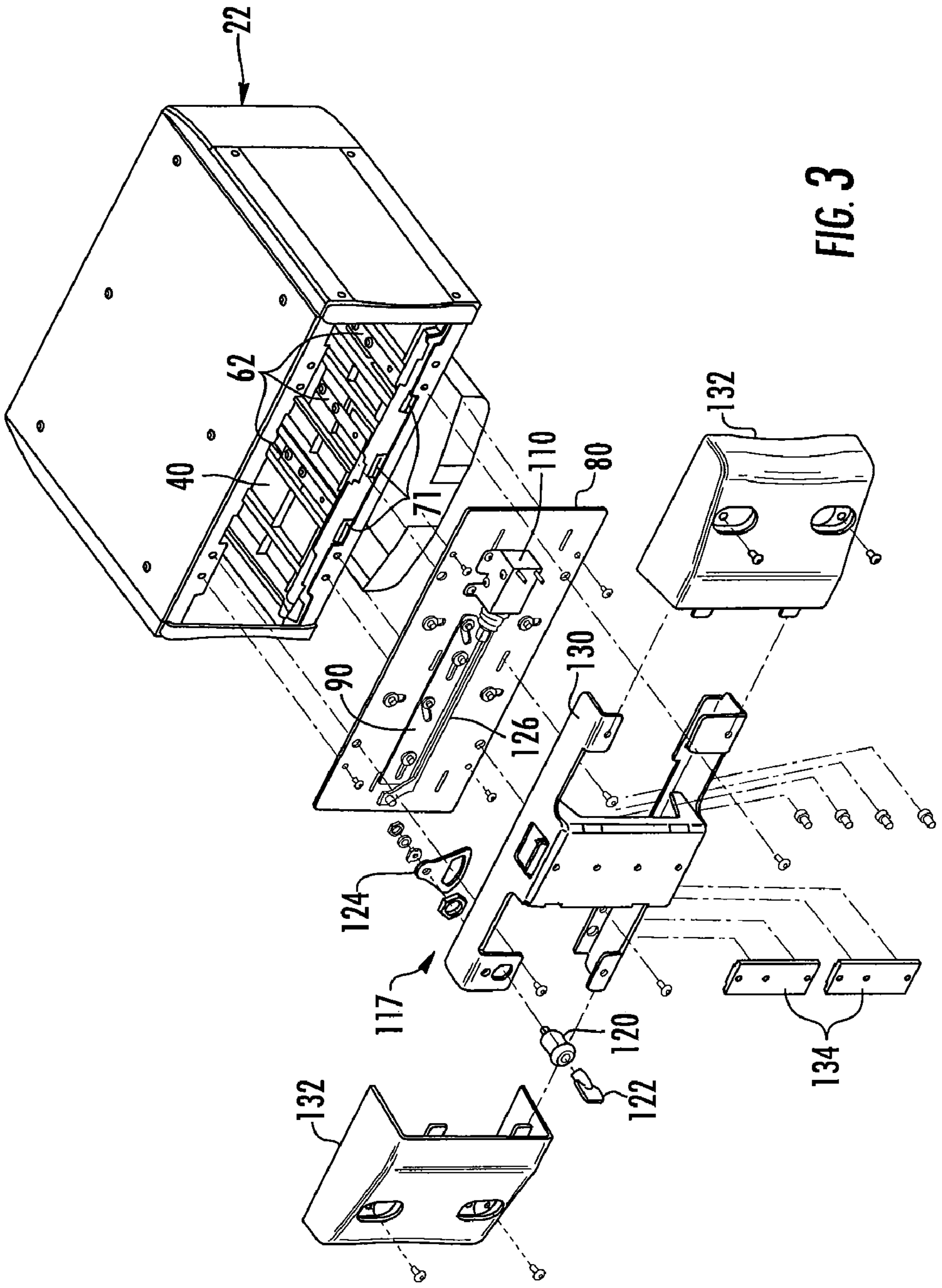
FIG. 3 is an exploded perspective back view of the cabinet assembly and lock of the invention.
Figure 6:
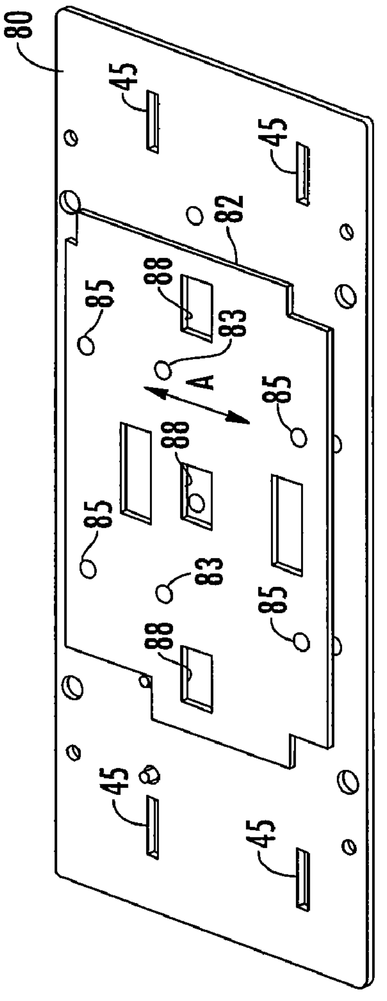
FIG. 6 is a perspective front view of the lock actuator of the invention.
Figure 7:
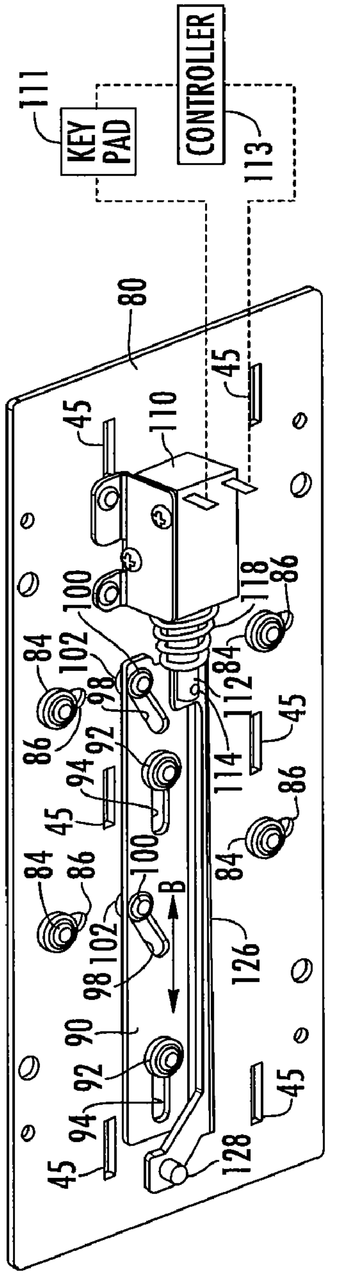
FIG. 7 is a perspective back view of the lock actuator of the invention.

The lock actuator mechanism for opening the lock will be described with reference to FIGS. 3, 6 and 7. The back wall 32 of cabinet 22 is formed with a stationary plate 80 that substantially covers the back of the interior space of cabinet 22. On the front face of plate 80 (the "front" being the face of the plate facing the interior of the cabinet 22) a slide plate 82 is mounted for vertical reciprocating movement relative to plate 80 in the direction of arrow A. Specifically, fasteners or pins 84 engage through holes 85 formed on the slide plate 82 and extend through vertically extending slots 86 formed on the plate 80. The fasteners 84 can slide in slots 86 such that slide plate 82 can move vertically relative to the plate 80. The slide plate 82 includes apertures 88, one aperture is provided for each latch. The end of each latch 70 includes a projecting tongue 71 that engages one of the apertures 88. As the slide plate 82 moves down relative to the plate 80, latches 70 are forced up and down via their engagement with apertures 88.

To move the slide plate 82 a drive plate 90 is mounted to the back of stationary plate 80. Drive plate 90 is mounted for horizontal reciprocating movement relative to plate 80 in the direction of arrow B. Specifically, fasteners or pins 92 are fixed to the plate 80 and extend into horizontal slots 94. The slots 94 allow the drive plate 90 to slide horizontally over fasteners 92. Drive plate 90 further includes angled camming slots 98 that extend at approximately a 45 degree angle relative to slots 94. Camming slots 98 receive fasteners or pins 100 that are fixed to sliding plate 82 at through holes 83. Fasteners 100 extend through vertically extending slots 102 formed in plate 80. When drive plate 90 is moved horizontally relative to stationary plate 80 camming slots 98 drive fasteners 100 up and down in vertical slots 102. Because fasteners 100 are connected to slide plate 82, plate 82 is simultaneously driven up and down relative to back plate 80 in the direction of arrow A.

To move the drive plate 90, a solenoid driver 110 is provided having a reciprocating plunger 112 that is connected to drive plate 90 by pin 114. Actuation of the solenoid 110 moves the drive plate 90 to the right as viewed in FIG. 7. When the drive plate 90 is moved to the right, fasteners 100 and sliding plate 82 are driven downward by camming slots 98. As the slide plate 82 moves downward the engagement of slots 88 with the tongues 71 on the latches 70 drives the latches downward and out of engagement with the catches 56 on drawers 50 to unlock the drawers. The drawers can then be opened by sliding the drawers out of the cabinet 22. When the solenoid 110 is deactivated, spring 118 forces the drive plate to the left as viewed in the FIG. 7. When the drive plate 90 is moved to the left, fasteners 100 and slide plate 82 are driven upward by camming slots 98. As the sliding plate 82 moves upward, the engagement of slots 88 release the latches 70 allowing members 62 to move the locking members 70 upward and into engagement with the catches 56 on drawers 50 to lock the drawers. The spring 118 maintains the slide plate 82 in this position. In one embodiment the solenoid 110 is activated electronically by a key pad 111 on the cabinet. The user may input a PIN code into the key pad 111 that is recognized by the system controller 113 enabling a signal to be sent to the solenoid 110 to actuate the solenoid and unlock the drawers 50. While the drive for the lock actuator is electronically controlled and accessed using a PIN code it will be appreciated that other actuators may be used and that secure access to the system may be contolled by a device other than a PIN code such as a key card or the like.

As a safety precaution a manual override 117 is provided that allows an authorized user to open and lock the drawers in the event that the solenoid or electronic security systems fail. Referring to FIG. 3 the manual override comprises a keyed lock 120 that can be turned by a user by key 122. When lock 120 turns it rotates segment cam 124. Segment cam 124 engages pin 128 to move lever 126. Lever 126 is connected to plunger 112 to manually move the plate 90 between the open and closed positions in the event that solenoid 110 cannot be actuated electronically.

The lock actuator is covered by a mounting bracket 130 and cover plates 132. The mounting bracket 130 may be connected to friction plates 134 that connect the drawer assembly 20 to the medical cart tower 6. In other applications the cabinet may be mounted to other structures via different mounting assemblies.

Figure 10:
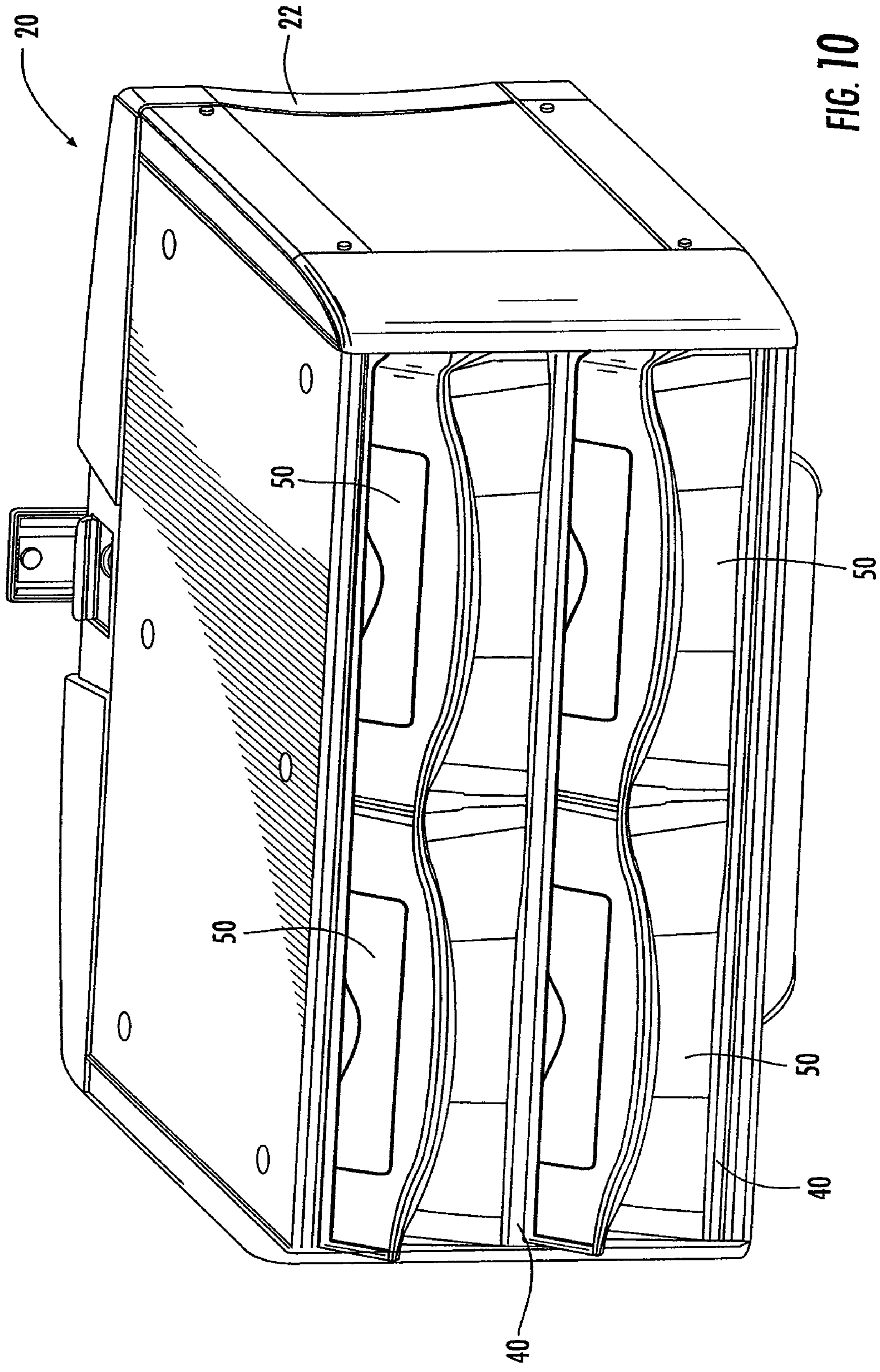
FIGS. 10 through 12 are perspective views showing various exemplary drawer configurations used in the drawer assembly of the invention.
Figure 11:
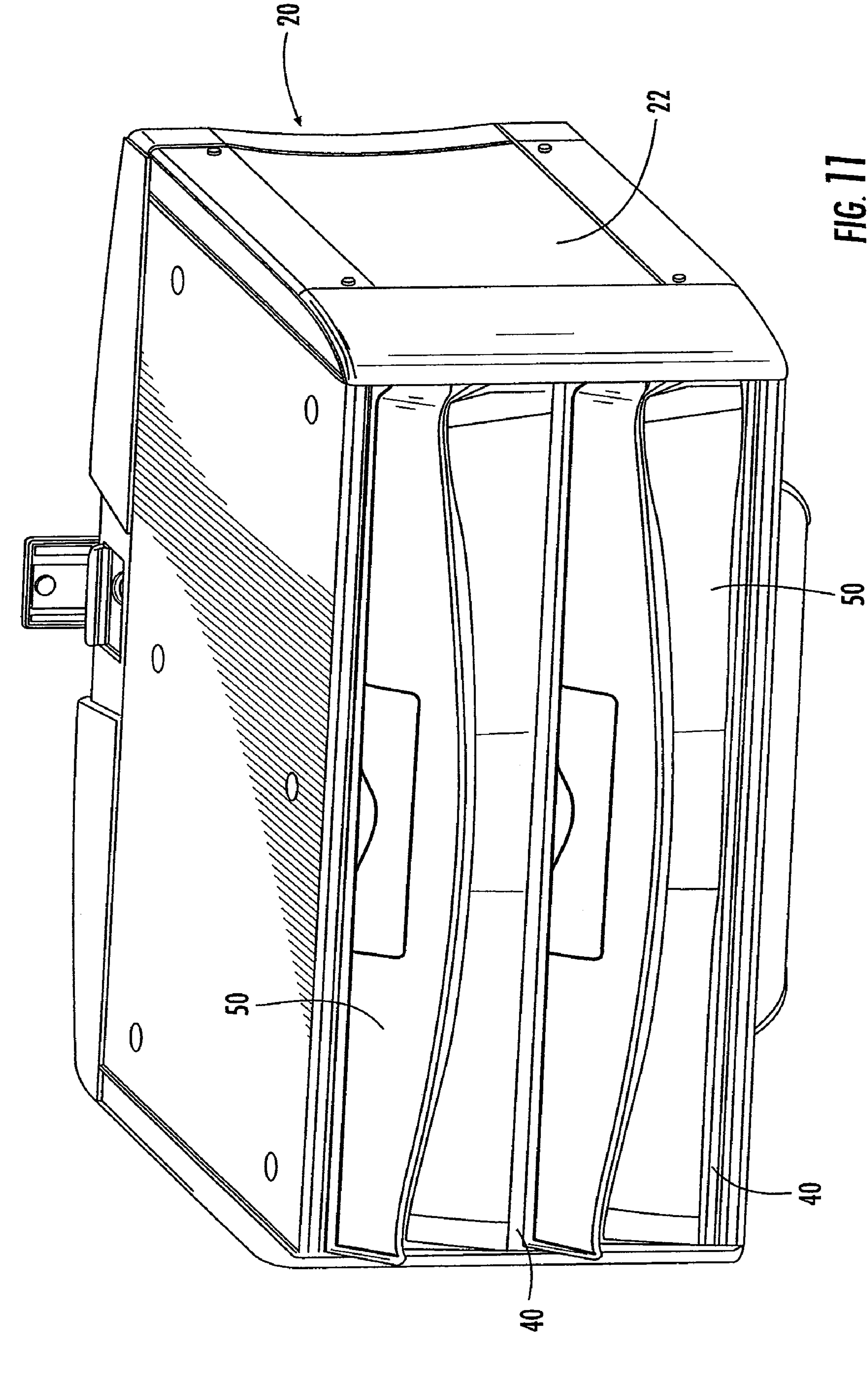
Figure 12:
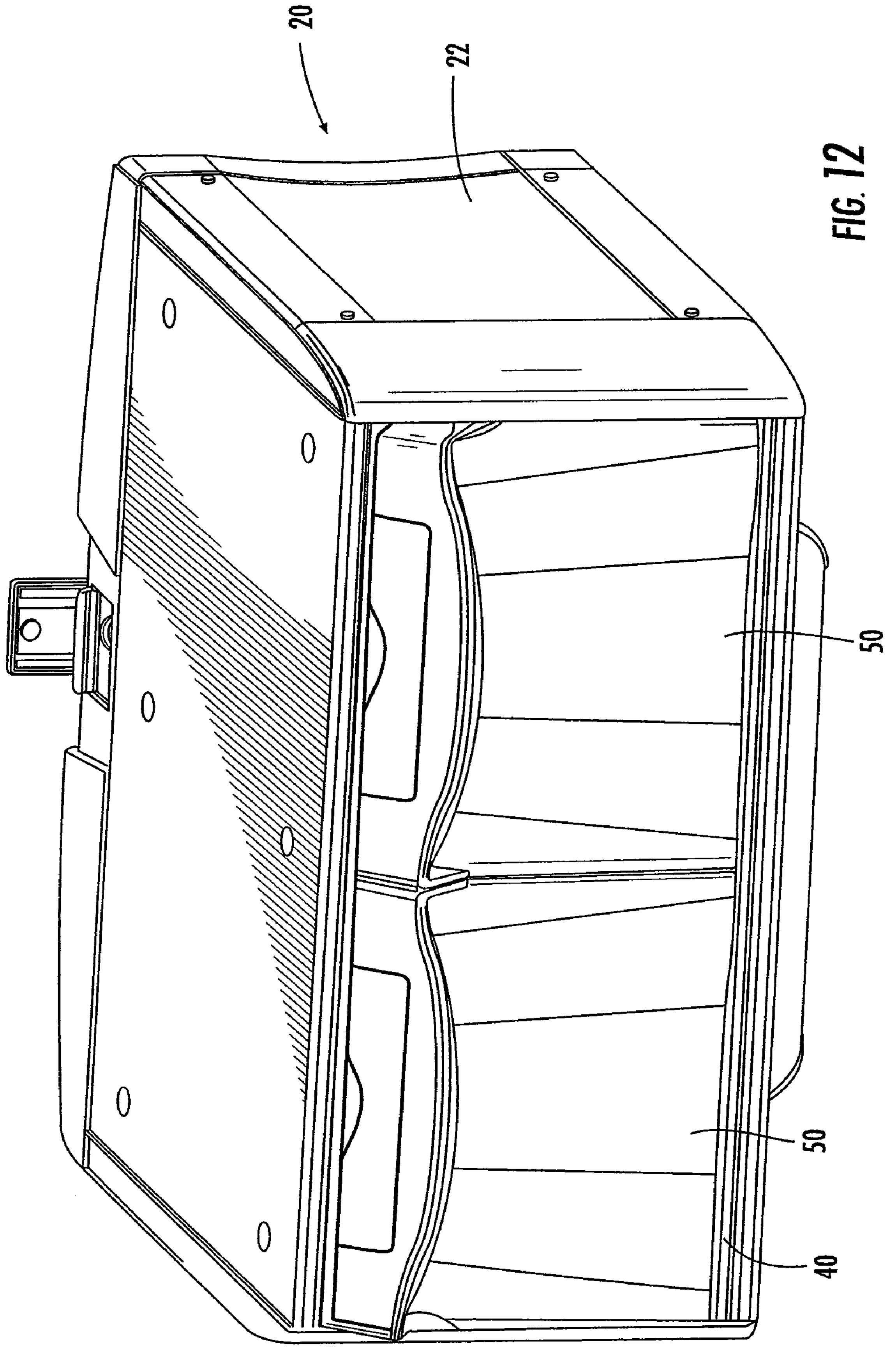

In the embodiment of FIGS. 1 and 2 the drawer assembly of the invention comprises two shelves with each shelf supporting three drawers dimensioned to fit side by side across the width of the shelf. In this embodiment the each drawer is secured by one of the three latches as previously described. Referring to FIG. 10 the drawer assembly of the invention comprises two shelves 40 with each shelf supporting two drawers 50 dimensioned to fit side by side on the shelf. In this embodiment the each drawer may be secured by one or two latches. Referring to FIG. 11 the drawer assembly of the invention comprises two shelves 40 with each shelf supporting one drawer dimensioned to fit the width of the shelf. In this embodiment the each drawer is secured by all three latches. Referring to FIG. 12 the drawer assembly of the invention comprises one shelf 40 with the shelf supporting two drawers 50 dimensioned to fit side by side on the shelf and filling the entire height of the cabinet. In this embodiment the each drawer may be secured by one or two latches. Other drawer configurations are also possible by varying the number of shelves and the number of drawers per shelf.

In operation of the drawer assembly of the invention the lock assembly is normally in the locked position with the locking members 70 biased upward toward the drawers 50 by supports 62. To insert or close a drawer 50 the drawer is inserted or pushed into the cabinet 22 with the rails 54 located in the grooves 52 to properly position the drawer. The drawer 50 is pushed toward the back of the cabinet 22 until the lower edge of the drawer and/or the catches 56 contact the cam surface 78 and force the locking member 70 down and away from the drawer. The drawer 50 is pushed into the cabinet 22 until the locking member 70 clears the catch 56 at which time the support member 62 forces the locking member 70 into interference engagement with the catch 56. If the drawer 50 is pushed in all of the way the front finger 74 engages the front wall 56*a* and if the drawer is left slightly ajar the front finger 74 engages the back wall 56*b*. In either position the drawer 50 is prevented from being pulled out by the engagement of the locking member 70 with the catch 56. The shelf remains locked until the user actuates the solenoid 110 or uses the manual override 118. For security purposes the solenoid 110 may only be actuated after the user enters an appropriate PIN code or satisfies other security criteria. Actuation of the solenoid 110 causes the solenoid to move the drive plate 90 which causes the slide plate 82 to move downward moving the locking members 70 away from engagement with the catches 56 allowing the drawer to be pulled from the cabinet.

Figure 14:
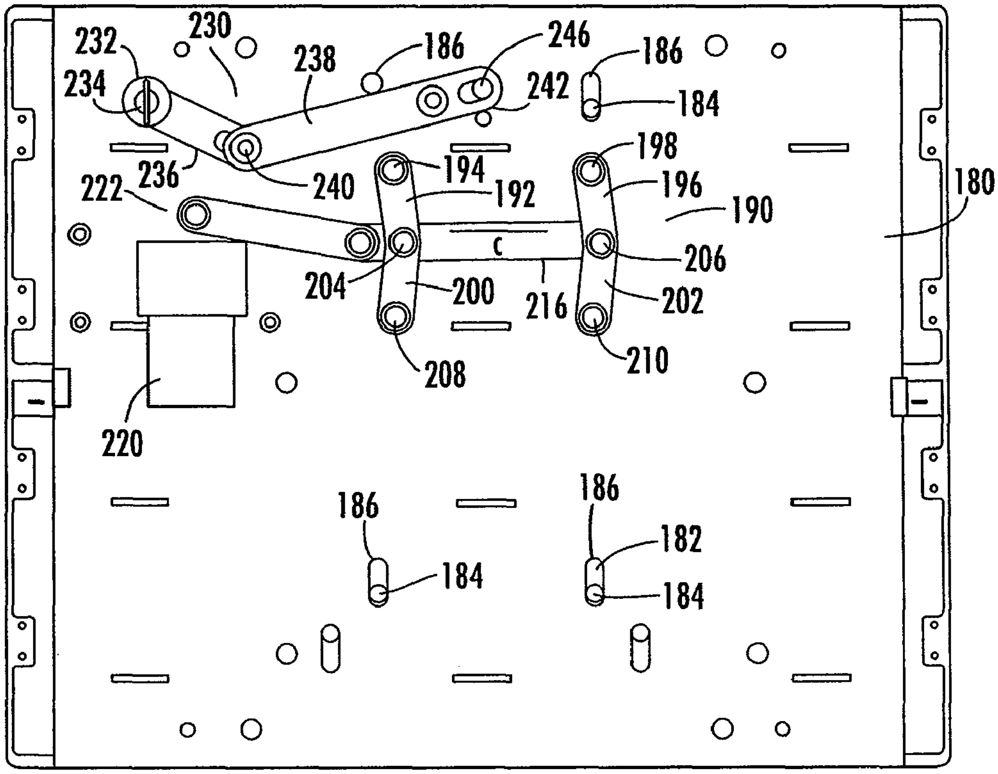
FIGS. 14 and 15 show alternate embodiments of the lock actuator of the invention.
Figure 15:
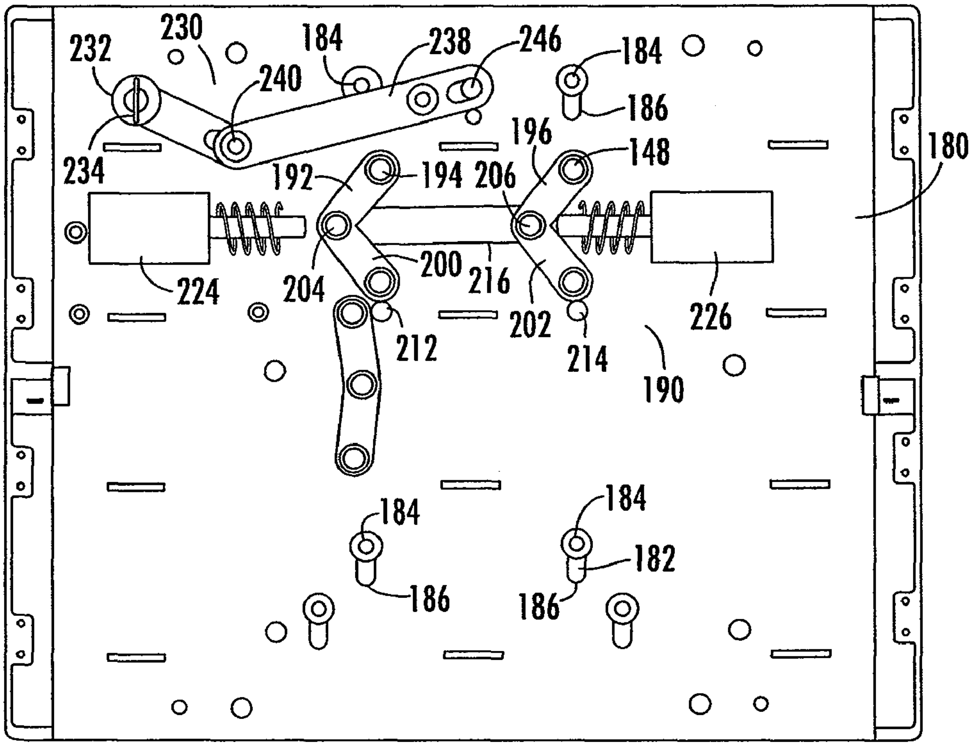

Alternate embodiments of the actuator mechanism are shown in FIGS. 14 and 15. Stationary plate 180 substantially covers the back of the interior space of cabinet 22. On the front face of plate 180 (the "front" being the face of the plate facing the interior of the cabinet 22) a slide plate 82 is mounted for vertical reciprocating movement relative to plate 180 as previously described with respect to FIG. 6. Slide plate 186 is on the opposite side of plate 180 as viewed in FIGS. 14 and 15 and is visible through slots 186. Fasteners or pins 184 are fixed to the slide plate 82 and extend through vertically extending slots 186 formed on the plate 180. The fasteners can slide in slots 186 such that the slide plate 82 can move vertically relative to the plate 180. The slide plate 82 includes apertures that receive the end of each latch to move the latches as previously described with respect to FIG. 6.

To move the slide plate 82 an over center linkage 190 is provided. The linkage comprises a first link 192 fixed to the plate 180 at pivot pin 194 and a second link 196 fixed to the plate 180 at pivot pin 198. The opposite ends of links 192 and 196 are pivoted to links 200 and 202, respectively, via pivot pins 204 and 206. The opposite ends of links 200 and 202 are connected to the slide plate 82 by pivot pins 208 and 210, respectively, that extend through vertical slots 212 and 214 formed in plate 180. A link 216 is connected between pivot pins 204 and 206 such that as link 216 moves in the direction of arrow C, the linkage moves from the unlocked position shown in FIG. 14 to the locked position shown in FIG. 15. In the unlocked position (FIG. 14) link 216 is moved rightward as shown in FIG. 14 to extend the link pairs 194, 200 and 196, 202, forcing pins 208 and 210 to the bottom of slots 212 and 214. As pins 208 and 210 move down, slide plate 82 is also moved downward, forcing the locking members 70 out of engagement with the catches 56 formed on the drawers 50 as previously described. In the unlocked position the link pairs 192, 200 and 196, 202 are in an over center position and will remain in this position until link 216 is moved back to the left. To lock the drawers, link 216 is moved leftward as shown in FIG. 15 to retract the link pairs 194, 200 and 196, 202, forcing pins 208 and 210 to the top of slots 212 and 214. As pins 208 and 210 move up, slide plate 182 is also moved upward, allowing the locking members 70 to be moved into engagement with the catches 56 formed on the drawers as previously described. In the embodiment of FIG. 14 link 216 is moved by a gearmotor 220 that reciprocates link 216 via a linkage 222. In the embodiment of FIG. 15 link 216 is moved by a pair of solenoids 224 and 226 that act on opposite ends of the link 216. The two solenoids may be replaced by a single solenoid with a spring return as previously described.

Further, the lock actuator shown in FIGS. 6 and 7 may use the gearmotor 220 or dual solenoids 224, 226 as described with reference to FIGS. 14 and 15.

A manual override 230 may be provided that allows an authorized user to open the drawers in the event that the solenoid or electronic security systems fail. The manual override comprises a keyed lock 232 that can be turned by a user by key 234. When lock 232 turns it rotates link 236. Link 236 rotates lever 238 about pin 240. As lever 238 rotates its free end moves pivot pin 240 via the engagement of pin 240 with slot 242 formed in lever 238. Pivot pin 240 extends through vertical slot formed in plate 180 and is connected to slide plate 82 such that movement of pin 240 in slot 242 cause slide plate 82 to move up and down between the locked and unlocked positions as previously described.

Specific embodiments of an invention are disclosed herein. One of ordinary skill in the art will recognize that the invention has other applications in other environments. Many embodiments are possible. The following claims are in no way intended to limit the scope of the invention to the specific embodiments described above.

The invention claimed is:

1. A drawer assembly comprising:

a cabinet defining an internal space;

a shelf in said space, said shelf supporting a latch that is movable between a locked position and an unlocked position;

a drawer supported on said shelf, said drawer having a catch formed thereon, said catch including a first surface engageable with said latch when said latch is in the locked position and a second surface engageable with said latch when said latch is in the locked position such that said drawer can be locked relative to the cabinet in one of two positions when said latch is engageable with said first surface and said second surface wherein said latch comprises an elongated resilient support member having one end secured to the shelf and a second end extending into and through an aperture formed in the shelf.

2. The drawer assembly of claim 1 wherein said shelf is removably supported in the cabinet.

3. The drawer assembly of claim 1 wherein the drawer has a bottom surface, said bottom surface being formed with a channel that extends from near a front edge of the drawer toward a back edge of the drawer.

4. The drawer assembly of claim 3 wherein said channel rides on a rail formed on the at least one shelf to guide the movement of the drawer into and out of said cabinet.

5. The drawer assembly of claim 1 wherein said catch includes a projection extending from said drawer that is engaged by said latch.

6. The drawer assembly of claim 1 wherein said latch further includes a locking member secured to the second end of the support member.

7. The drawer assembly of claim 6 wherein said locking member includes a first finger and a second finger that are spaced from one another.

8. The drawer assembly of claim 7 wherein a face of the first finger is formed as a camming surface that is contacted by said drawer when said drawer is pushed into the cabinet to deform the support member and force the locking member away from the drawer.

9. The drawer assembly of claim 6 said support member biasing the locking member into engagement with the catch to lock the drawer in the closed position.

10. The drawer assembly of claim 9 wherein when said locking member is engaged with said catch the second finger is disposed behind a wall of said shelf.

11. The drawer assembly of claim 1 wherein a security device prohibits unauthorized actuation of said latch.

12. The drawer assembly of claim 11 wherein the security device includes a PIN code received by a system controller.

13. The drawer assembly of claim 1 further including a manual override to open the drawers.

14. The drawer assembly of claim 13 wherein said manual override comprises a keyed lock.

15. The drawer assembly of claim 1 wherein said cabinet is secured to a medical cart.

16. The drawer assembly of claim 15 wherein the medical cart comprises a base supported on wheels.

17. The drawer assembly of claim 16 further including a computer mounted on the medical cart.

18. The drawer assembly of claim 16 further including a wireless communications systems on the medical cart to communicate with a wider network system.

19. A drawer assembly comprising:

a cabinet defining an internal space;

a shelf in said space, said shelf supporting a latch that is movable between a locked position and an unlocked position;

a drawer supported on said shelf, said drawer having a catch formed thereon, said catch including a first surface engageable with said latch when said latch is in the locked position and a second surface engageable with said latch when said latch is in the locked position such that said drawer can be locked relative to the cabinet in one of two positions when said latch is engageable with said first surface and said second surface;

a slide plate mounted for reciprocating movement, the slide plate including an aperture for receiving said latch such that as the slide plate moves said latch is moved.

20. The drawer assembly of claim 19 further comprising fasteners extending through said slide plate and through slots formed on a stationary plate.

21. The drawer assembly of claim 20 further including a drive plate mounted for reciprocating movement including an angled camming slot that receives a fastener that is fixed to said slide plate, said fastener extending through slots formed in said stationary plate such that when said drive plate is moved, said camming slot moves said slide plate.

22. The drawer assembly of claim 21 wherein a solenoid driver moves said drive plate.

23. The drawer assembly of claim 22 further including a spring to maintain the latch in the locked position upon deactivation of said solenoid.

24. The drawer assembly of claim 19 wherein said slide plate moves such that said aperture moves the latch out of engagement with the catch to unlock said drawer.

25. A drawer assembly comprising:

a cabinet defining an internal space;

a shelf in said space, said shelf supporting a latch that is movable between a locked position and an unlocked position, said latch having a first finger and a second finger;

a drawer supported on said shelf, said drawer having a catch formed thereon, said catch having a surface engageable with said first finger when said latch is in the locked position and engageable with said second finger when said latch is in the locked position such that said drawer can be locked relative to the cabinet in one of two positions when said catch is engageable with said first finger and said second finger;

a slide plate mounted for reciprocating movement, the slide plate including an aperture for receiving said latch such that as the slide plate moves said latch is moved.

* * * * *